United States Patent
Marcillaud et al.

(10) Patent No.: US 10,363,633 B2
(45) Date of Patent: Jul. 30, 2019

(54) METHOD FOR MANUFACTURING AT LEAST ONE METAL TURBINE ENGINE PART

(71) Applicant: SNECMA, Paris (FR)

(72) Inventors: Celine Jeanne Marcillaud, Moissy Cramayel (FR); Sebastien Digard Brou De Cuissart, Moissy Cramayel (FR); Marie Mineur-Panigeon, Moissy Cramayel (FR); Anthony Texier, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 14/434,252

(22) PCT Filed: Oct. 9, 2013

(86) PCT No.: PCT/FR2013/052412
§ 371 (c)(1),
(2) Date: Apr. 8, 2015

(87) PCT Pub. No.: WO2014/057222
PCT Pub. Date: Apr. 17, 2014

(65) Prior Publication Data
US 2015/0231746 A1     Aug. 20, 2015

(30) Foreign Application Priority Data
Oct. 9, 2012 (FR) .................... 12 59616

(51) Int. Cl.
*F01D 5/14* (2006.01)
*B22D 13/00* (2006.01)
(Continued)

(52) U.S. Cl.
CPC .............. *B23P 15/02* (2013.01); *B22D 13/00* (2013.01); *B22D 13/02* (2013.01); *B22D 25/02* (2013.01);
(Continued)

(58) Field of Classification Search
CPC .......... B23P 15/02; B22D 13/02; B22D 25/02
See application file for complete search history.

(56) References Cited

U.S. PATENT DOCUMENTS 5,119,865 A * 6/1992 Mae ..................... B22D 13/066
164/114
5,671,533 A * 9/1997 Dillamore ................ B21J 5/002
29/527.6

(Continued)

FOREIGN PATENT DOCUMENTS

| CN | 101564763 A | 10/2009 |
| GB | 2 290 998 | 1/1996 |

(Continued)

OTHER PUBLICATIONS

Achtermann et al. "Production of (gamma)-TiAl based feed stock materials for subsequent investment casting and forging operations" (Year: 2011).*

(Continued)

*Primary Examiner* — Jacob J Cigna
(74) *Attorney, Agent, or Firm* — Oblon, McClelland, Maier & Neustadt, L.L.P.

(57) ABSTRACT

A method of fabricating at least one metal part for a turbine engine, the method including the steps of casting a metal alloy by centrifuging into a permanent metal mold for making a blank; obtaining a cast blank of elongate shape and of section that is circular or polygonal; and machining the blank to make the part.

10 Claims, 3 Drawing Sheets

(51) Int. Cl.
    *B22D 13/02*        (2006.01)
    *B23P 15/02*        (2006.01)
    *B22D 25/02*        (2006.01)

(52) U.S. Cl.
    CPC .......... *F01D 5/147* (2013.01); *F05D 2230/10* (2013.01); *F05D 2230/21* (2013.01); *Y10T 29/49336* (2015.01)

(56) References Cited

U.S. PATENT DOCUMENTS

| | | | | |
|---|---|---|---|---|
| 5,743,711 | A * | 4/1998 | Fournier | F01D 5/3015 |
| | | | | 415/209.2 |
| 2002/0014006 | A1 * | 2/2002 | Brock | B23P 15/02 |
| | | | | 29/889.7 |
| 2003/0042001 | A1 * | 3/2003 | Ray | B22C 3/00 |
| | | | | 164/529 |
| 2004/0040690 | A1 * | 3/2004 | Ray | B22D 13/00 |
| | | | | 164/529 |
| 2005/0016706 | A1 * | 1/2005 | Ray | B22D 19/14 |
| | | | | 164/97 |
| 2005/0279481 | A1 * | 12/2005 | Renkel | B22D 13/04 |
| | | | | 164/114 |
| 2010/0089500 | A1 * | 4/2010 | Renkel | B22D 13/026 |
| | | | | 148/539 |
| 2012/0048430 | A1 * | 3/2012 | Das | B21J 1/00 |
| | | | | 148/557 |
| 2016/0318137 | A1 * | 11/2016 | Huchin | B23P 15/02 |

FOREIGN PATENT DOCUMENTS

| | | |
|---|---|---|
| JP | 2006 336059 | 12/2006 |
| RU | 2 157 296 C1 | 10/2000 |

OTHER PUBLICATIONS

International Search Report dated Apr. 16, 2014 in PCT/FR13/052412 Filed Oct. 9, 2013.

Zhang Ping chief Editor, Summary "Mechanical Manufacturing technology Machining Basic skill training", p. 1, 2012,(with English Translation and cover pages), 6 pages.

Pierre R. Robergo (CA), "Material Selection", Manuscript for Corrosion Engineering, China Oil chemistry, p. 465, Apr. 30, 2003, (with English Translation), 3 pages.

* cited by examiner

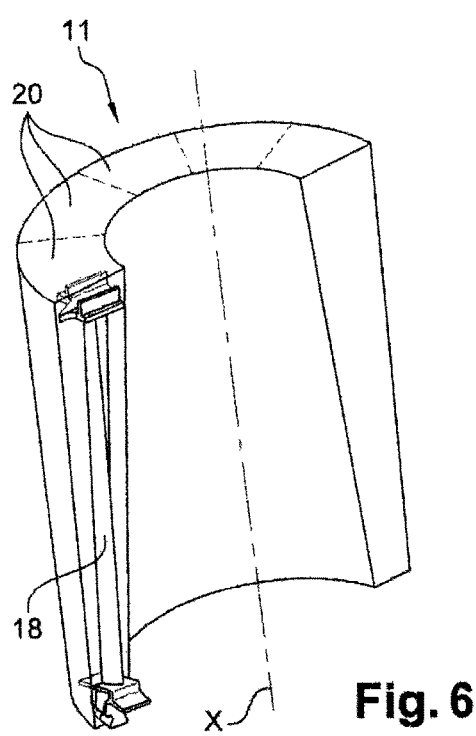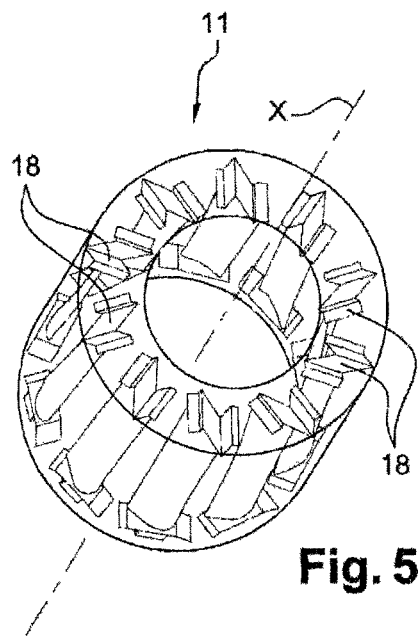
Fig. 5
Fig. 6

METHOD FOR MANUFACTURING AT LEAST ONE METAL TURBINE ENGINE PART

BACKGROUND OF THE INVENTION

Field of the Invention

The present invention relates to a method of fabricating at least one metal part for a turbine engine, and in particular at least one blade of a turbine rotor of an airplane turboprop or turbojet.

Description of the Related Art

It is known to use the lost-wax molding technique for fabricating a plurality of turbine engine blades simultaneously. It should be recalled that precision lost-wax molding comprises making a model of each of the desired blades out of wax, by injecting the wax into tooling. These models are then assembled on casting arms also made of wax, thereby constituting a cluster, which is then dipped into various substances in order to form on the cluster a ceramic shell of thickness that is substantially uniform.

The method continues by melting the wax so as to leave an exact imprint of the wax inside the ceramic, and then pouring molten metal into the imprint, generally via a pouring bush. After the metal has cooled, the shell is destroyed and the metal parts are separated and finished off by machining.

Such a method requires rare materials to be used, such as yttria, for example, in order to form the shell, and that can lead to problems of supply. Developing the shell is relatively difficult, since it requires a compromise to be found between the ability of the shell to withstand centrifugal forces and its friability in order to facilitate unmolding. Such a method also requires a specific installation to be used. Finally, there is also a risk of the parts being made brittle as a result of needle inclusions being formed that are associated with debris from the shell becoming detached and being found in the part.

Furthermore, when the metal used for making blades is of the TiAl type, there is a high risk of there being pores in the resulting parts. This type of alloy solidifies very quickly, thereby making it difficult to design the shape of the part. Also under such circumstances, it is necessary to perform heat treatment of the hot isostatic compression (HIC) type in order to close the pores, if any. In addition to its considerable cost, such heat treatment does not enable all of the pores to be closed, in particular pores opening out in one of the outside surfaces of the part.

Furthermore, during the hot isostatic compression heat treatment, residual stresses accumulate in the part. Unpredictable deformation can then be found during subsequent machining of the part.

BRIEF SUMMARY OF THE INVENTION

The present invention makes it possible to remedy at least some of the above-mentioned drawbacks in a manner that is simple, effective, and inexpensive.

To this end, the invention provides a method of fabricating at least one metal part for a turbine engine, the method comprising the steps consisting in:

a) casting a metal alloy by centrifuging into a permanent metal mold for making a blank;

b) obtaining a cast blank of elongate shape and of section that is circular or polygonal; and c) machining the blank to make the part.

The invention makes it possible to reduce casting defects by using a permanent metal mold. This avoids interactions between a ceramic mold and molten metal, and also avoids geometrical defects due to the poor quality of waxes or to forming a cluster.

Furthermore, the use of a blank that is simple in shape, in combination with centrifuging, serves to optimize filling of the mold. The amount of material used may also be reduced as a result of the centrifuging, since the center of the mold no longer needs to be filled completely, unlike a solution involving casting by gravity. Centrifugal casting also makes it possible to have a better compromise between the filling speed and the speed at which the metal solidifies.

The use of a permanent metal mold also makes it possible to provide molds that can accommodate high levels of centrifugal pressure, thereby avoiding lengthy and expensive operations of forming clusters and of drying ceramic shells, and also avoiding recurrent manufacturing process costs and times associated with fabricating ceramic shells for single use. In contrast, a permanent metal mold is reusable and is easy to use (the manufacturing process for the parts is less complex). It is thus possible to shorten production cycles.

Another advantage of using a blank that is simple in shape is that it does not require dimensions to be checked prior to machining. The simple shape of the blank, having at least one plane of symmetry, serves to reduce risks of deformation, in particular during heat treatment of the hot isostatic compression type, if any, where such a shape gives rise to few out-of-compliance parts and also makes it easy to automate the machining step. This type of shape also avoids creating hot points, a phenomenon that can arise when a thick zone is surrounded by zones that are thinner. The metallurgy of the resulting parts is thus better controlled.

Advantageously, the machined parts are turbine engine blades, such as turbine blades, for example.

Preferably, the metal alloy is TiAl-based, e.g. of the TiAl 48-2-2 type.

TiAl 48-2-2 includes 48% aluminum, 2% chromium, and 2% niobium (atomic percent).

According to a characteristic of the invention, the blank obtained in step b) is subjected to heat treatment prior to machining step c).

Under such circumstances, said heat treatment may include a step of hot isostatic compression.

The idea is to obtain a duplex microstructure constituted by gamma grains and by lamellar grains (alpha2/gamma).

In particular, the heat treatment that is applied may be that which is described in U.S. Pat. No. 5,609,698 and may include a heat treatment step in preparation for hot isostatic compression during which the blank is subjected to a temperature lying in the range 1900° F. to 2100° F. for a duration lying in the range 5 hours (h) to 50 h, a hot isostatic compression step at 2200° F., followed by an additional step during which the blank is subjected to a temperature lying in the range 1850° C. to 2200° F.

According to another characteristic of the invention, step a) consists in particular in melting an ingot into a cooled metal crucible and in pouring the metal melted in this way into a centrifuged permanent mold.

The blank obtained in step b) may be solid, with at least one part then being machined from the core of the blank.

In a variant, the blank obtained in step b) may be tubular, with at least one part then being machined from the thickness of the tubular wall of the blank.

Under such circumstances, the number of parts machined from the blank may be greater than six, and preferably is not less than ten.

BRIEF DESCRIPTION OF THE SEVERAL VIEWS OF THE DRAWINGS

Other advantages and characteristics of the invention appear on reading the following description made by way of non-limiting example and with reference to the accompanying drawings, in which:

FIG. 5 is a diagrammatic perspective view of a hollow cylindrical bar of the invention from which turbine engine blades are to be machined; and FIG. 6 is a diagrammatic view in perspective and in axial section of the bar of FIG. 5.

DETAILED DESCRIPTION OF THE INVENTION

Figure 1:
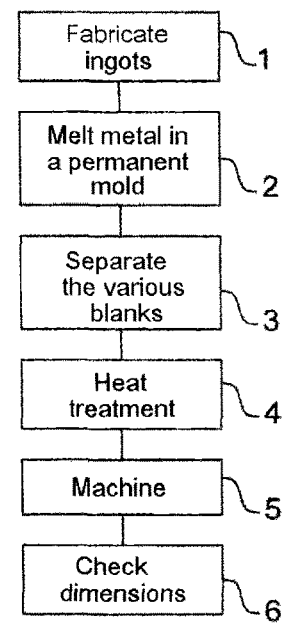
FIG. 1 is a diagrammatic flow chart showing the various successive steps in an implementation of the method of the invention.

FIG. 1 is a flow chart showing the various successive steps in an implementation of the method of the invention.

The method comprises a first step 1 of fabricating at least one ingot, e.g. out of a gamma-TiAl type alloy, preferably of TiAl 48-2-2 type. TiAl 48-2-2 comprises 48% aluminum, 2% chromium, and 2% niobium (atomic percent).

The ingot may be made by a method of the vacuum arc remelting (VAR) type or of the plasma arc melting (PAM) type.

Figure 2:
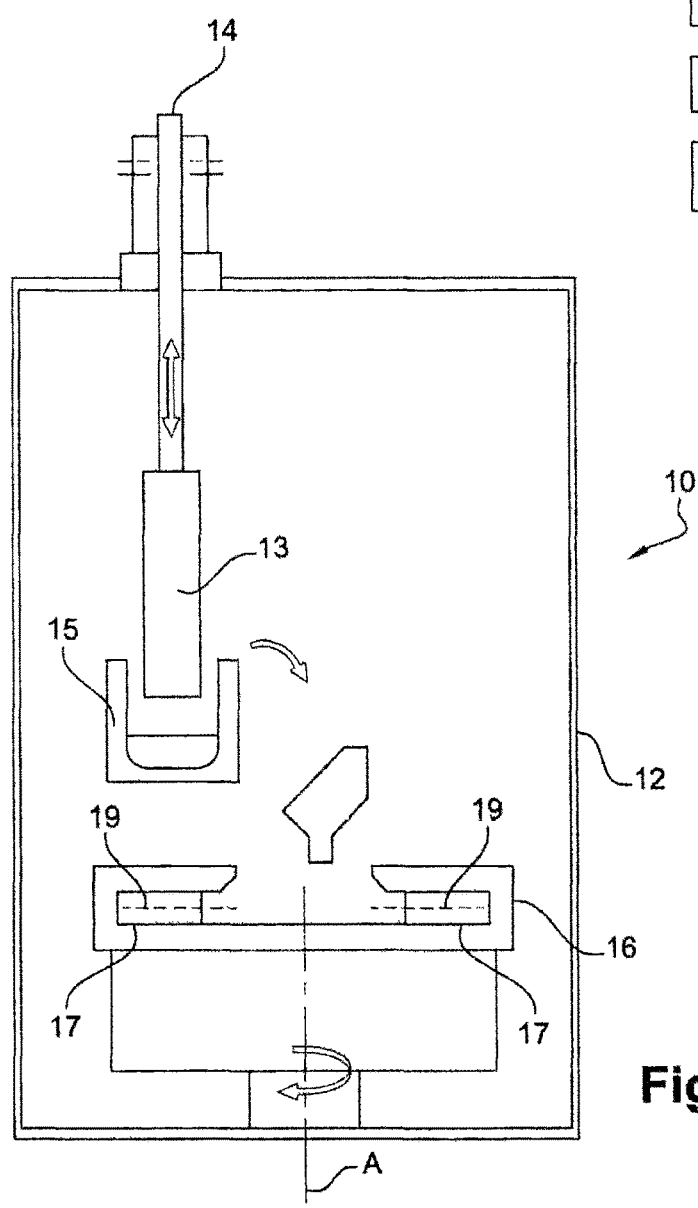
FIG. 2 shows a device for melting, casting, or molding blanks.

Thereafter, the method has a step 2 of remelting the ingot by the VAR method in a metal crucible and of pouring it into a centrifuged permanent mold. This step is described in detail with reference to FIG. 2.

This figure shows a device 10 for fabricating blanks 11, e.g. in the form of cylindrical bars, by successive operations of melting, casting, and molding.

The device 10 comprises a closed and leaktight enclosure 12 in which a partial vacuum is established. The ingot 13 made of metal alloy, e.g. based on TiAl, is fastened to one end of an electrode 14 that is connected to one terminal of an electricity source having its other terminal connected to a crucible 15 housed in the enclosure 12. In order to melt the ingot 13, the electrode 14 is moved over the crucible 15 with small-amplitude reciprocating movements. When the ingot 13 comes close to the crucible 15, electric arcs form between the crucible 15 and the ingot 13, thereby causing the ingot 13 to melt and drop into the bottom of the crucible 15 (VAR: vacuum arc remelting). When the ingot 13 has been completely melted, the molten metal alloy in the crucible 15 is poured into the permanent mold 16 made of metal.

The mold 16 enables the alloy to be cast by centrifuging. For this purpose, the mold 16 is set into rotation about an axis A, the mold 16 having a plurality of cylindrical housings 17 that extend radially around the axis A and that are regularly spaced apart around the axis A. The centrifugal force generated by rotating the mold 16 forces the molten alloy to penetrate into the housings 17 and fill them.

After cooling, the mold 16 is opened and the "rough" casting is extracted. The casting is in the form of a wheel having a plurality of radial blanks 11 secured via their radially inner ends to a common central hub.

Each blank 11 is in the form of a solid cylinder and may be separated from the hub and from the other blanks 11 by machining (step 3 in FIG. 1), and thereafter it may be subjected to heat treatment (step 4 in FIG. 1).

The heat treatment applied may in particular be that described in U.S. Pat. No. 5,609,698 and it may include a heat treatment step in preparation for hot isostatic compression, during which the blank 11 is subjected to a temperature lying in the range 1900° F. to 2100° F. for a duration lying in the range 5 h to 50 h, then a step of hot isostatic compression at 2200° F., followed by an additional step during which the blank is subjected to a temperature in the range 1850° C. to 2200° F.

After the blank 11 has been subjected to heat treatment it is machined (step 5 in FIG. 1) in order to form at least one blade 18.

Figure 3:
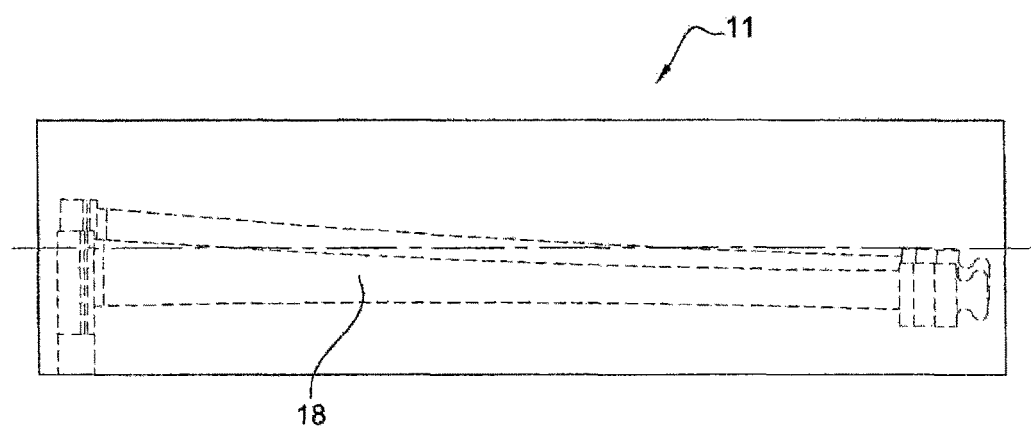
FIGS. 3 and 4 are a diagrammatic side view and a diagrammatic end view of a solid cylindrical bar in which a turbine engine blade is to be machined.
Figure 4:
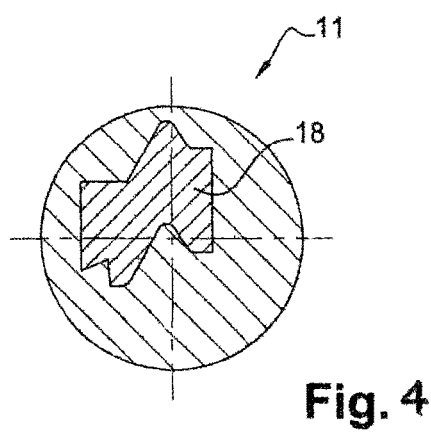

FIGS. 3 and 4 show in particular the situation in which a single blade 18 is machined from a blank.

Naturally, it is also possible, for example, to machine three, four, five, or even six blades 18 from a single blank 11.

It should be observed that it is also possible to obtain blanks 11 that are tubular in shape. For this purpose, a cylindrical core 19 (represented diagrammatically by a dashed line in FIG. 2) may be mounted coaxially inside each of the housings 17.

FIGS. 5 and 6 thus show a blank 11 in the form of a bar of hollow cylindrical shape.

In a particular implementation of the invention, the bar has a length or axial dimension lying in the range 10 centimeters (cm) to 50 cm, an outside diameter lying in the range 5 cm to 20 cm, an inside diameter lying in the range 4 cm to 10 cm, and a radial thickness lying in the range 1 cm to 10 cm.

As can be seen in FIGS. 5 and 6, the tubular blank 11 is machined to make ten rotor blades 18, each blade 18 having an airfoil with its ends connected to platforms. The blades 18 are machined from the thickness of the wall of the tubular blank 11, over angular sectors 20 of the blank 11 that are arranged side by side, each being of an elongate shape extending substantially parallel to the longitudinal axis X of the blank (the sectors 20 are defined by dashed lines in FIG. 6).

The wall of the blank 11 may be of thickness that varies along the longitudinal axis X (cf. FIG. 6).

At the end of machining, the blades are inspected (step 6 in FIG. 1) using non-destructive inspection methods (radio, penetrant inspection, dimensional checking).

The invention claimed is:

1. A method of fabricating a turbine engine blade for a turbine engine, the method comprising:
   a) casting a metal alloy by centrifuging into a permanent metal mold for making a blank, the permanent metal mold rotating about an axis during the casting;
   b) obtaining a cast blank of elongate shape and of section that is circular or polygonal; and
   c) machining the blank to make the turbine engine blade by removing material of the blank to reveal all exterior features of the turbine engine blade,
   wherein the metal alloy is TiAl-based, wherein the permanent metal mold includes a plurality of housings extending radially from the axis and being regularly spaced around the axis, wherein the cast blank is initially in a form of a wheel including a plurality of radial blanks in which radially inner ends of the radial blanks are secured to a common central hub, and wherein the blank obtained in step b) is tubular, with at least one turbine engine blade being machined from a thickness of a tubular wall of the blank.

2. A method according to claim 1, wherein the metal alloy is TiAl 48-2-2.

3. A method according to claim 1, wherein step a) comprises melting an ingot into a cooled metal crucible and pouring the metal melted into a centrifuged permanent mold.

4. A method according to claim 1, wherein the number of turbine engine blades machined from the blank is greater than six.

5. A method according to claim 1, wherein the blank obtained in step b) is obtained by separating the blank from the wheel having the plurality of radial blanks secured at the radially inner ends thereof to the common central hub by machining.

6. A method according to claim 1, wherein each of the housings of the plurality of housings is cylindrical.

7. A method according to claim 1, wherein the blank obtained in step b) is subjected to heat treatment prior to machining step c).

8. A method according to claim 7, wherein said heat treatment includes a step of hot isostatic compression.

9. A method of fabricating a turbine engine blade for a turbine engine, the method comprising:
a) casting a metal alloy by centrifuging into a permanent metal mold for making a blank, the permanent metal mold rotating about an axis during the casting;
b) obtaining a cast blank of elongate shape and of section that is circular or polygonal; and
c) machining the blank to make the turbine engine blade by removing material of the blank to reveal all exterior features of the turbine engine blade, wherein the metal alloy is TiAl-based, wherein the permanent metal mold includes a plurality of housings extending radially from the axis and being regularly spaced around the axis, wherein the cast blank is initially in a form of a wheel including a plurality of radial blanks in which radially inner ends of the radial blanks are secured to a common central hub, wherein the turbine engine blade includes a dovetail attachment at a first end and a platform with a sealing element at a second end, and wherein the blank obtained in step b) is tubular, with at least one turbine engine blade being machined from a thickness of a tubular wall of the blank.

10. A method according to claim 9, wherein each of the housings of the plurality of housings is cylindrical.

* * * * *

UNITED STATES PATENT AND TRADEMARK OFFICE
CERTIFICATE OF CORRECTION

PATENT NO. : 10,363,633 B2
APPLICATION NO. : 14/434252
DATED : July 30, 2019
INVENTOR(S) : Celine Jeanne Marcillaud et al.

Page 1 of 1

It is certified that error appears in the above-identified patent and that said Letters Patent is hereby corrected as shown below:

On the Title Page

Item (71) Applicant, change "SNECMA" to --SAFRAN AIRCRAFT ENGINES--

Signed and Sealed this
Tenth Day of March, 2020

Andrei Iancu
*Director of the United States Patent and Trademark Office*